United States Patent [19]

Kanoh et al.

[11] 4,173,698

[45] Nov. 6, 1979

[54] POLYMERIZATION OF OLEFIN

[75] Inventors: Natsuki Kanoh, Sagamihara; Toru Tanaka, Komae; Atsushi Murakami, Machida, all of Japan

[73] Assignee: Mitsubishi Chemical Industries Ltd., Tokyo, Japan

[21] Appl. No.: 800,179

[22] Filed: May 25, 1977

[30] Foreign Application Priority Data

Jun. 22, 1976 [JP] Japan .................................. 51/73672

[51] Int. Cl.$^2$ ......................... C08F 4/68; C08F 10/02
[52] U.S. Cl. .................................. 526/142; 252/429 B; 252/429 C; 526/157; 526/169.2; 526/348.6; 526/352
[58] Field of Search .............................. 526/142, 157

[56] References Cited

U.S. PATENT DOCUMENTS

| | | | |
|---|---|---|---|
| 1,001,820 | 8/1965 | Kodak ................................. | 526/142 |
| 3,130,003 | 4/1964 | Tornqvist et al. .................... | 526/157 |
| 3,269,996 | 8/1966 | Langer ................................. | 526/142 |
| 3,369,011 | 2/1968 | Valvassori et al. ................... | 526/142 |
| 3,989,881 | 11/1976 | Yamaguchi et al. ................. | 526/125 |
| 4,060,593 | 11/1977 | Kazuo et al. ........................ | 526/142 |

*Primary Examiner*—Edward J. Smith
*Attorney, Agent, or Firm*—Oblon, Fisher, Spivak, McClelland & Maier

[57] ABSTRACT

A solid catalytic component for polymerization of an olefin is prepared by reacting a vanadium trichloride ether complex with aluminum halide.

5 Claims, No Drawings

POLYMERIZATION OF OLEFIN

BACKGROUND OF THE INVENTION

1. Field of the Invention

The present invention relates to a solid catalytic component and a process for preparing polyolefin by using said catalytic component. More particularly, it relates to a process for preparing polyolefin by using a vanadium type catalyst having high catalytic activity.

2. Description of Prior Art

Heretofore, it has been well-known that catalysts which are combinations of an organoaluminum compound with a vanadium halide such as vanadium tetrachloride, vanadium trichloride or vanadyl trichloride are quite useful for the polymerization of olefins.

If a catalytic activity for polymerization is high enough to use the resulting polyolefins without separating catalyst residues from the polymer in the preparation of the polyolefins, the industrial advantage of an elimination of the catalyst residues separating step is remarkable.

However, the conventional catalysts do not possess satisfactorily high catalytic activity so as to use the resulting polyolefin without separating the catalyst residues.

Moreover, the conventional catalysts have disadvantages of severe lowering of polymerization velocity in the operation for a long time.

SUMMARY OF THE INVENTION

It is an object of the present invention to provide a catalyst which can be used for polymerization of olefins and has enough high catalytic activity to impart said industrial advantages for eliminating a step of separating catalyst residues from the resulting polyolefin.

It is another object of the present invention to provide a catalyst having high catalytic activity for preparing a polyolefin without lowering a polymerization velocity for a long time.

It is the other object of the present invention to provide a process for polymerizing an olefin with a catalyst having high catalytic activity without lowering a polymerization velocity for a long time.

These and other objects of the present invention have been attained by providing a catalyst which comprises an auxiliary catalytic component of an organoaluminum compound and a solid catalytic component prepared by reacting a vanadium trichloride ether complex with an aluminum halide, and providing a polymerization of an olefin by using said catalyst.

DESCRIPTION OF THE PREFERRED EMBODIMENTS

The solid catalytic component of the present invention can be easily prepared by reacting a vanadium trichloride ether complex with an aluminum halide.

The vanadium trichloride ether complexes used in the invention are complexes of vanadium trichloride coordinating with one of various ethers.

The vanadium trichloride ether complex can be prepared by dissolving vanadium trichloride in the corresponding ether at a boiling point or lower temperature with stirring and removing excess of the ether, preferably under a reduced pressure.

Suitable ethers include straight chain type ethers such as diethyl ether, di-iso-propyl ether, di-iso-butyl ether, di-iso-pentyl ether, ethyl-n-butyl ether, di-n-hexyl ether, di-n-octyl ether; aromatic ethers such as methylphenyl ether; cyclic ethers such as tetrahydrofuran, tetrahydropyran, dioxane, furan, pyran, etc.

It is preferable to use cyclic ethers, especially, tetrahydrofuran and tetrahydropyran from the viewpoints of easy formation of the complex and solubility of the complex to a solvent.

The aluminum halides have the formula $AlX_3$ wherein X represents a halogen atom (which can be different each other).

Suitable aluminum halides can be $AlF_3$, $AlCl_3$, $AlBr_3$, $AlI_3$ and $AlBrI_2$ etc.

It is preferable to use $AlCl_3$, $AlBr_3$ or $AlI_3$.

The amount of the aluminum halide has close relation with the molar ratio of the ether in the vanadium trichloride ether complex measured according to the elemental analysis, and it is selected from a molar ratio of Al/ether of 0.1 to 10, preferably 0.5 to 2.

The reaction of the aluminum halide with the vanadium trichloride ether complex is preferably conducted in the presence of a solvent.

In usual, the vanadium trichloride ether complex is dissolved in a solvent and the aluminum halide is added to the solution.

In the other method, an aluminum halide is added to a liquid vanadium trichloride ether complex or a supernatant liquid (when an insoluble matter is remained) which is obtained by dissolving vanadium trichloride in the ether and a solvent of a hydrocarbon or a halogenated hydrocarbon. In the process, the aluminum halide is added to the vanadium trichloride ether complex in a form of powder or a solution dissolved in a solvent.

The reaction of the vanadium trichloride ether complex with the aluminum halide is usually conducted at the room temperature, though it can be conducted by heating at the temperature lower than a boiling point of the solvent.

The solvents should dissolve the aluminum halide and the ether complex but should not dissolve the resulting solid catalyst.

Although any solvent for dissolving the vanadium trichloride ether complex can be used, the solvent forming a complex with vanadium trichloride in high degree is not suitable.

Suitable solvents can be hydrocarbons such as hexane, heptane, benzene, toluene; halogenated hydrocarbons such as tetrachloromethane, chloroform, dichloroethane, trichloroethane, butylchloride, chlorobenzene etc.

It is preferable to use a halogenated hydrocarbon which dissolves the vanadium trichloride ether complex in high degree.

It is considered that when the vanadium trichloride ether complex is reacted with the aluminum halide, a part or whole of ether in the complex is separated, to form a solid, and the separated free ether is reacted with the aluminum halide to form the aluminum halide ether complex.

The solid catalytic component obtained by the process of the present invention is characterized by resulting small particle size of crystallites which is considered to be one of the reasons for the advantages of remarkably high catalytic activity which could not be attained by the conventional catalytic components.

The secondary structure of the crystallites is formed by the agglomeration of crystallites to form a solid catalytic particles. The average diameter of the particles is dependent upon the condition of the process and is in a range of 3 to 20μ and the distribution of the particle diameters is remarkably narrow. Accordingly, when polyolefin is prepared by the slurry polymerization or the gaseous polymerization by the process of the present invention, the distribution of diameters of the resulting polyolefin particles becomes quite narrow and the handling of the resulting polyolefin powder is remarkably advantageous.

In the reaction, the product obtained by removing the aluminum halide ether complex and the unreacted aluminum halide by washing with the solvent, is preferably used as the solid catalytic component in the invention.

That is, when these compounds are remained, the catalytic activity for polymerization per the solid catalytic component is reduced disadvantageously.

In some purpose, the separation of these compounds is not always necessary.

When the halogenated hydrocarbon is used as a solvent in the preparation of the solid catalytic component and the solvent is remained in the solid catalytic component, the auxiliary catalytic component of the organoaluminum compound is consumed by it. Accordingly, it is preferable to remove the solvent before the polymerization by a distillation or the other method or to replace the solvent to an inactive hydrocarbon solvent.

It is preferable to use a hydrocarbon solvent used in the polymerization of an olefin.

Suitable organoaluminum compounds used as the auxiliary catalyst in the invention include trialkylaluminum such ss trimethylaluminum, triethylaluminum, tripropylaluminum, triisobutylaluminum, trioctylaluminum; dialkylaluminum monohalides such as dimethylaluminum monochloride, diethylaluminum monochloride; alkylaluminum sesquihalides such as methylaluminum sesquichloride, ethylaluminum sesquichloride,; dialkyl aluminum monoalkoxides such as diethylaluminum monoethoxide, diethylaluminum monomethoxide, etc..

It is preferable to use the trialkylaluminum or dialkylaluminum monohalide.

The ratio of the solid catalytic component to the auxiliary catalytic component is in a range of 0.1 to 100, preferably 1 to 10 as a molar ratio of Al/V.

The polymerization of an olefin is conducted by using the resulting catalyst system.

Suitable olefins used in the process of the present invention include ethylene, propyrene, butene-1, pentene-1, octene-1, etc.

It is possible to copolymerize two or more olefins.

The process of the present invention is especially preferable to prepare a polyolefin such as a homopolymer of ethylene; a copolymer containing less than 10 wt.%, preferably less than 5 wt.% of one or more comonomer units based on ethylene unit.

Suitable comonomers used in the process of the present invention include an α-olefin having the carbon number of 3 to 12 such as propyrene, butene-1, pentene-1, octene-1, etc.

The polymerization of an olefine can be a solution polymerization, a slurry polymerization in an inert solvent or a gaseous polymerization in the absence of a solvent.

In usual, the polymerization is conducted in the presence of an inert solvent by feeding an olefin or an olefin mixture at suitable temperature and pressure.

Suitable inert solvents include aliphatic hydrocarbons such as pentane, hexane, heptane, octane, isooctane; alicyclic hydrocarbons such as cyclopentane, cyclohexane, and aromatic hydrocarbons such as benzene, toluene, etc.

The polymerization of an olefin is usually conducted at the temperature of the room temperature to 200° C. under the pressure of the atmospheric pressure to 100 atm.

When hydrogen is introduced into the polymerization zone, the effect for controlling the molecular weight by hydrogen is remarkably high to easily obtain the polymer having suitable molecular weight.

The amount of hydrogen is dependent upon the condition of polymerization and molecular weight of the object polyolefin and it should be selected depending upon these factors.

As described above, the catalyst system used in the process of the present invention has remarkably high catalytic activity whereby the step of separating the catalyst residues can be eliminated in the polymerization of an olefin of the present invention and the industrial advantages can be attained.

When the catalytic system is used, the polymerization velocity is not lowered for a long time and the productivity of the polyolefin can be remarkably improved in comparison with the conventional vanadium type catalysts.

The invention will be further illustrated by certain Examples which are provided herein for purpose of illustration only and are not intended to be limiting in any manner unless otherwise specified.

The melt index (hereinafter referring to as MI) is measured by the method of ASTM D-1238-57T, under a load of 2.16 Kg.

Preparation 1

Preparation of $VCl_3.3THF$

In a Soxhlet extractor, 10 g of vanadium trichloride was dissolved under reflux, in 400 ml of dry and oxygen-free tetrahydrofuran (hereinafter referring to as THF).

After about 10 hours, the solid $VCl_3$ substantially disappeared the solution had deep reddish brown color, and was concentrated at 30° C. under a reduced pressure to remove excess THF, whereby a reddish orange powder was obtained.

According to the elemental analysis, the product was $VCl_3.3THF$.

|  | V | Cl | C | H |
|---|---|---|---|---|
| Found (wt. %) | 13.9 | 28.5 | 38.4 | 6.2 |
| Calculated as $VCl_3.3THF$ (wt. %) | 13.6 | 28.5 | 38.6 | 6.4 |

Preparation 2

Preparation of $VCl_3.3THP$

In accordance with the process of Preparation 1 except using tetrahydropyran (hereinafter referring to as THP instead of THF), the reddish orange powdery product was obtained.

According to the elemental analysis, the product was $VCl_3.3THP$.

|  | V | Cl | C | H |
|---|---|---|---|---|
| Found (wt. %) | 12.1 | 25.3 | 43.5 | 7.0 |

-continued

| | V | Cl | C | H |
|---|---|---|---|---|
| Calculated as VC$_3$.3THP (wt. %) | 12.3 | 25.6 | 43.3 | 7.2 |

Example 1

(1) Preparation of Vanadium containing solid catalytic component

In 90 ml of 1,2-dichloroethane, 3.0 g of VCl$_3$.3THF prepared in Preparation 1 was dissolved and 3.3 g of AlCl$_3$ powder was added to the solution with stirring.

The formation of violet precipitate was initiated by the addition. The mixture was stirred at 50° C. for about 1 hour.

After cooling it to the room temperature, the violet precipitate was washed with 1,2-dichloroethane and then, with n-hexane, and then, n-hexane was distilled off at the room temperature under a reduced pressure and the residue was dried to obtain 1.5 g of violet powder.

(2) Polymerization of Ethylene

Into a 1 liter autoclave equipped with a stirrer, 500 ml of purified n-hexane was charged and 16 mg of the catalytic component prepared in the previous process (1) and 0.30 m mole of triisobutyl aluminum were added.

The mixture was heated at 90° C., hydrogen was introduced to be 2.5 Kg/cm$^2$ and then, ethylene was introduced to be a total pressure of 13 Kg/cm$^2$.

Exothermic absorption of ethylene was found at the time feeding ethylene, ethylene was further introduced to maintain the total pressure of 13 Kg/cm$^2$.

The polymerization was stopped by charging ethanol under pressure after 1 hour to obtain 185 g of white powdery polyethylene having a MI of 0.75 and a K value was 1,100 (g-polymer/g-catalyst x hr. x ethylene pressure Kg/cm$^2$).

Example 2

The polymerization of ethylene was repeated in accordance with the process of Example 1 (2), except using 5 mg of the powder catalytic component instead of 16 mg and 0.10 m mole of triisobutyl aluminum instead of 0.30 m mole and polymerizing for 4 hours instead of 1 hour. As the result, 179 g of polyethylene having a MI of 0.71 was obtained. The K value was 1,064. The polymerization activity was substantially the same for about 4 hours.

Example 3

The preparation of the catalytic component was repeated in accordance with the process of Example 1 (1), except using 90 ml of chloroform instead of 90 ml of 1,2-dichloroethane and 6.7 g of AlBr$_3$ instead of 3.3 g of AlCl$_3$ to obtain violet powder.

The polymerization of ethylene was repeated in accordance with the process of Example 1 (2) except using 15 mg of the above violet powder of the catalytic component instead of 16 mg of the catalytic component.

As the result, 191 g of polyethylene having a K value of 1,213 and a MI of 0.77 was obtained.

Example 4

The preparation of the catalytic component was repeated in accordance with the process of Example 1 (1), except using 3.3 g of VCl$_3$.3THP instead of 3.0 g of VCl$_3$.3THF and 90 ml of monochlorobenzene instead of 90 ml of 1,2-dichloroethane to obtain violet powder.

The polymerization of ethylene was repeated in accordance with the process of Example 1 (2) except using 16 mg of the above violet powder of catalytic component instead of 16 mg of the catalytic component.

As the result, 181 g of polyethylene having a MI of 0.77 was obtained. The K value was 1,077.

Example 5

The polymerization of ethylene was repeated in accordance with the process of Example 1(2), except using 0.40 m mole of diethylaluminum chloride instead of 0.30 m mole of triisobutylaluminum. As the result, 148 g of polyethylene powder having a MI of 0.64 was obtained. The K value was 881.

Example 6

The polymerization of ethylene was repeated in accordance with the process of Example 1 (2) except introducing the additional ethylene together with butene-1 at 0.25 of a molar ratio of butene-1 to ethylene in the liquid phase for the polymerization.

As the result, 179 g of powdery polyethylene having a MI of 0.81 was obtained. Total ethyl groups were 2.7 per 1,000 of carbon atoms in the main chain, according to the infrared spectrography analysis. The K value was 1,078.

Reference 1

The polymerization of ethylene was repeated in accordance with the process of Example 1 (2) except using 16 mg of a commercially available VCl$_3$ powder instead of 16 mg of the catalytic component.

As the result, 37 g of polyethylene was obtained. The K value was 220.

Reference 2

The polymerization of ethylene was repeated in accordance with the process of Example 1 (2) except using 16 mg of a commercially available VCl$_3$ powder instead of 16 mg of the catalytic component, and polymerizing for 4 hours instead of 1 hour.

As the result, 96 g of polyethylene was obtained. The K value was 143.

Reference 3

The polymerization of ethylene was repeated in accordance with the process of Example 1 (2) except using 70 mg of VCl$_3$.3THF prepared in Preparation 1 instead of 16 mg of the catalytic component and 0.97 m mole of triisobutyl aluminum instead of 0.30 m mole.

As the result, 153 g of polyethylene was obtained. The K value was 208.

Reference 4

The polymerization of ethylene was repeated in accordance with the process of Example 1 (2) except using 30 mg of VCl$_3$.3THF prepared in Preparation 1 instead of 16 mg of the catalytic component and 0.97 m mole of triisobutyl aluminum instead of 0.30 m mole and polymerizing for 4 hours instead of 1 hour.

As the result, 155 g of polyethylene was obtained. The K value was 123.

What is claimed is:

1. In a process for polymerizing ethylene alone or a mixture containing ethylene and a different α-olefin to form copolymers containing less than 10 wt.% of the α-olefin in the presence of a catalyst system comprising an organoaluminum compound and a solid catalytic component, the improvement which comprises preparing said solid catalytic component by the process which comprises:
- (a) dissolving a vanadium trichloride-ether complex in a solvent to form a solution;
- (b) adding to said solution a quantity of an aluminum halide sufficient to yield a molar ratio of aluminum halide to the ether in the vanadium trichloride-ether complex of 0.1 to 10, whereby said aluminum halide reacts with said vanadium trichloride-ether complex to form a precipitate consisting essentially of said solid catalytic component; and
- (c) recovering said solid catalytic component.

2. The process of claim 1 wherein the solid catalytic component is washed with a solvent before combining it with the organoaluminum compound.

3. A process according to claim 1, wherein said solvent is a halogenated hydrocarbon.

4. A process according to claim 1, wherein said vanadium trichloride ether complex is vanadium trichloride tetrahydropyran complex.

5. A process according to claim 1, wherein said vanadium trichloride ether complex is vanadium trichloride tetrahydrofuran complex.

* * * * *